July 13, 1965  W. N. POUNDSTONE  3,194,387
TROUGHING IDLER ROLLER ASSEMBLY FOR BELT CONVEYORS
Original Filed Feb. 16, 1960  3 Sheets-Sheet 3
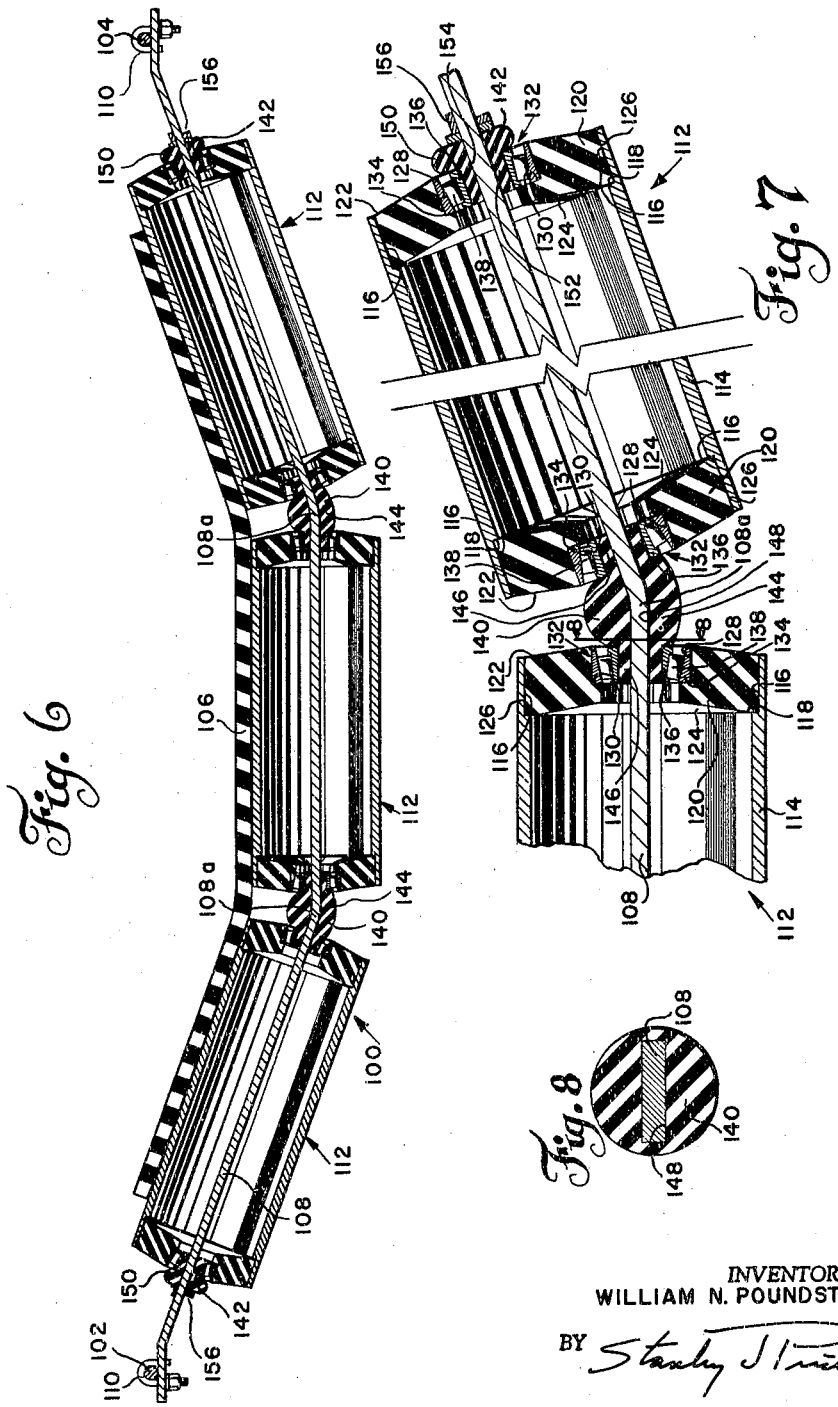
INVENTOR.
WILLIAM N. POUNDSTONE
BY
his ATTORNEY 3,194,387
TROUGHING IDLER ROLLER ASSEMBLY FOR
BELT CONVEYORS
William N. Poundstone, Morgantown, W. Va., assignor to
Christopher Coal Company, Osage, W. Va., a corporation of West Virginia
Original application Feb. 16, 1960, Ser. No. 9,077, now Patent No. 3,082,860, dated Mar. 26, 1963. Divided and this application Dec. 20, 1961, Ser. No. 160,774
2 Claims. (Cl. 198—192)

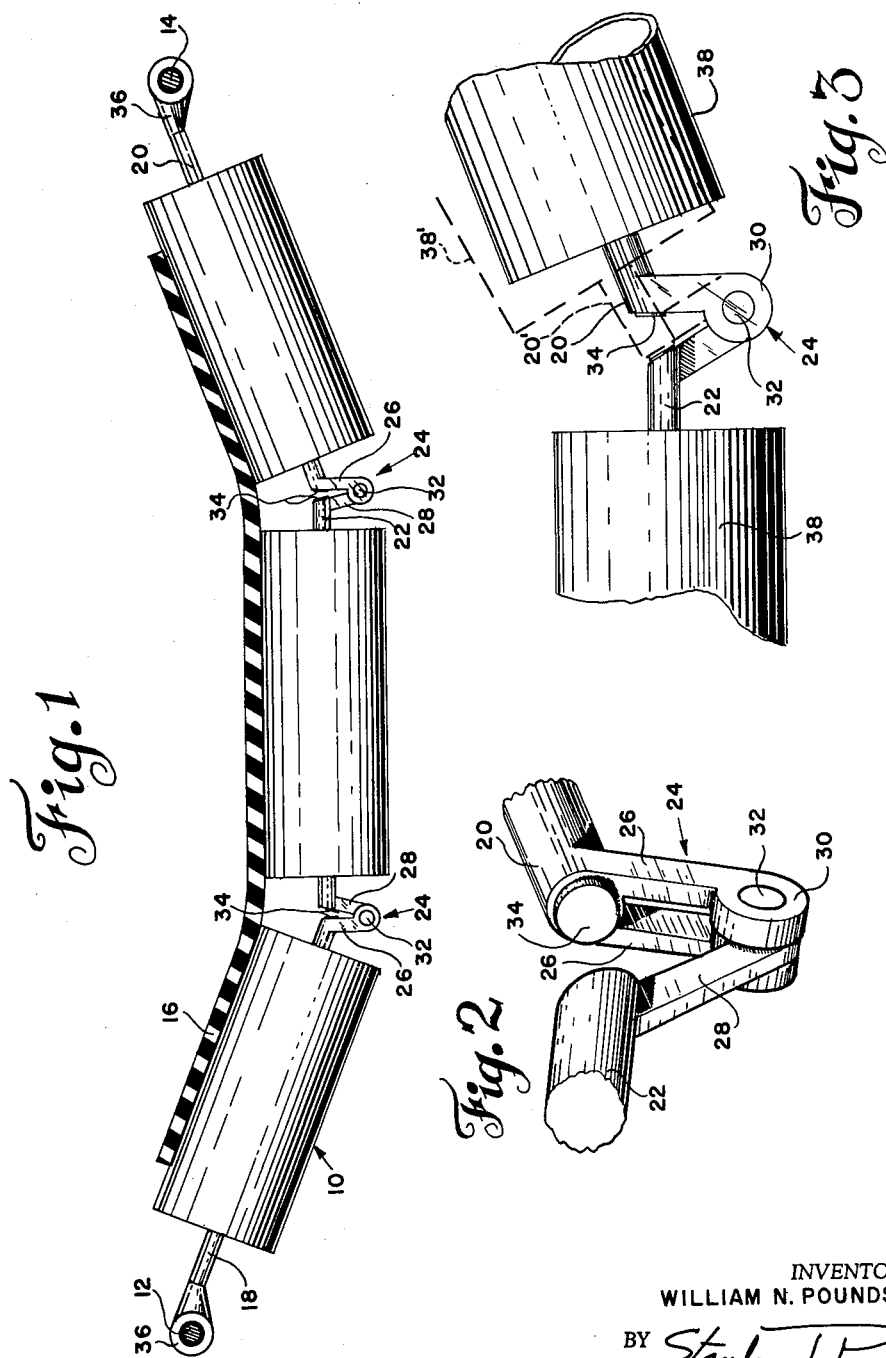

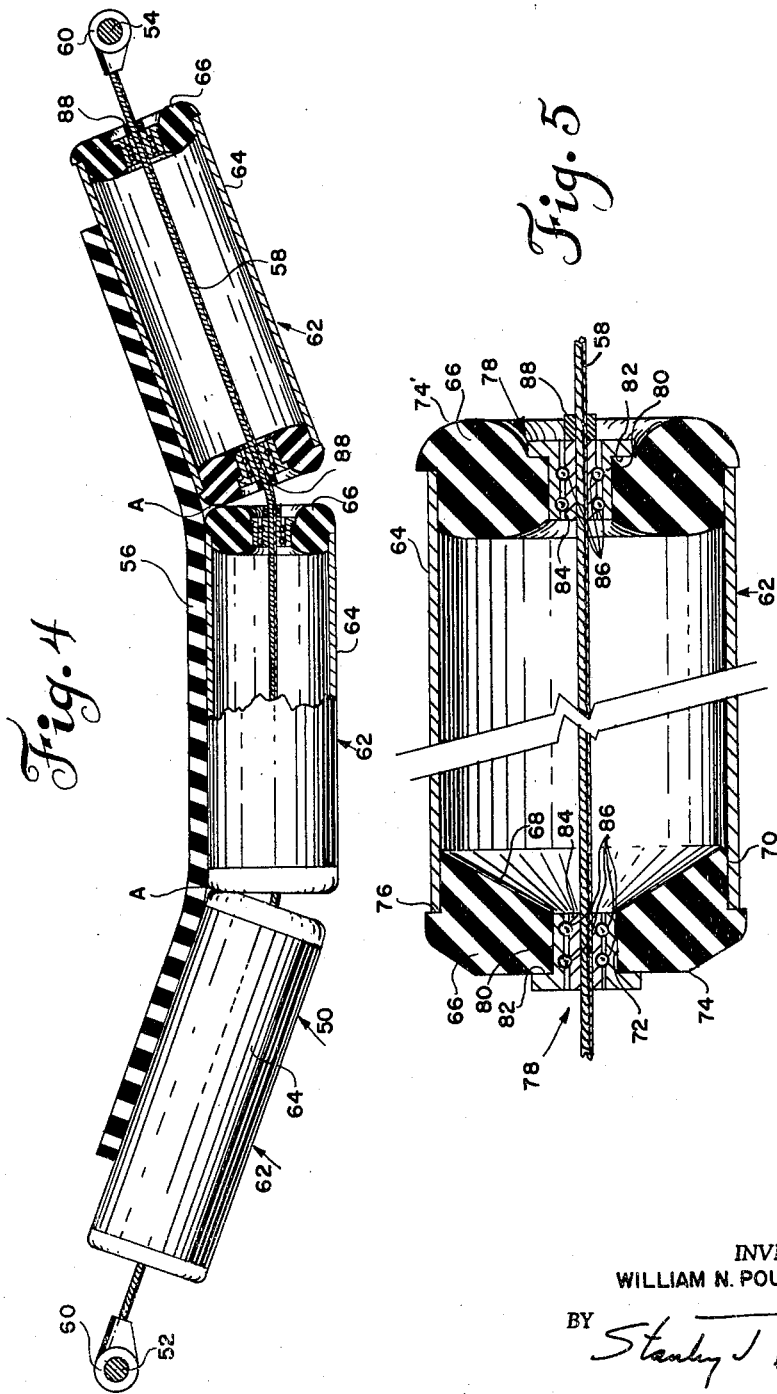

This invention relates to troughing idler rollers which are utilized to support the troughed conveying reach of an endless conveyor belt, and more particularly to improved idler roller assemblies for flexible side frame supported belt conveyors.

This is a division of my United States patent application Serial Number 9,077 filed on February 16, 1960, now Patent No. 3,082,860 and titled Troughing Idler Roller Assembly for Belt Conveyors.

The conventional endless belt conveyor consists of a belt supported by a series of idler rollers. The belt is driven by a belt drive means. The belt has a troughed conveying reach supported in a generally horizontal manner by a series of troughing idler rollers. The conveying reach carries the material to be transported by the conveyor belt. The conveyor belt has a return reach supported in a generally horizontal manner, usually below the conveying reach, by a series of return reach idler rollers. The return reach returns the empty portion of the belt to the belt drive to form a continuous path for the endless conveyor belt.

In recent years belt conveyors have been constructed in which a pair of flexible side frames are trained along a conveying course to support the conveyor belt. The flexible side frames are usually formed of wire rope or the like, and are supported at intervals by side frame supporting means such as vertical side frame supporting stands. The spaced side frames extend in a generally parallel manner along the conveying course. Idler rollers span the side frame members to support the conveying reach of a belt conveyor.

Flexible side frame belt conveyors have many advantages which make them popular in the mining industry. Among these advantages, flexible side frame conveyors are easily erected and disassembled for movement. Certain types of flexible side frame conveyors also provide an inherent belt training action which is valuable in belt conveyors. An example of an improved type of flexible side frame supported belt conveyor may be found in my co-pending United States patent application Serial No. 690,-684 filed on October 17, 1957.

In flexible side frame supported belt conveyors, the force exerted by the load on the conveyor belt conveying reach is transferred through the transversely extending idler rollers which support the conveying reach to the flexible side frames of the conveyor. Since the idler rollers are connected to the flexible side frames, this transfer of force causes the idler roller assemblies of a flexible side frame supported belt conveyor to react somewhat differently than the idler roller assemblies of rigid side frame supported conveyors as will be discussed in the following paragraphs.

In most material carrying belt conveyor systems, the conveying reach of the belt conveyor is troughed to retain the conveyed material. It is recognized as desirable to have the trough of the conveying reach deepen somewhat when the load on the conveying reach is increased so that a greater volume of material may then be retained on the belt. In the early flexible side frame supported conveyor systems, troughing idler rollers with flexible shaft members were utilized to support the belt conveying reach.

By flexible shaft members are meant both shaft members formed of flexible material such as wire rope and shaft members formed of sections of rigid material joined by pivot pins or hinged joints. The term is intended to encompass any shaft member which is not a rigid unit from end to end. These flexible shafted idler roller assemblies usually hung in approximately a catenary curve between two flexible side frame members of the conveyor system. As the load on the conveying reach of the belt conveyor was increased, the trough of the conveying reach deepened because the flexible shafter idler rollers permitted the catenary curve to change shape. The deepening of the rough of the conveying reach was also effected by the fact that the flexible side frame members of the conveyor system moved toward each other in the vicinity of the transversely extending idler roller assemblies. This inward movement of the flexible side frames of the conveyor system had the effect of shortening the span which the flexible shafted roller assemblies bridged. Although a certain amount of trough deepening under load is desirable, excessive deepening of the troughed conveying reach of the belt conveyor often occurred when the conveying reach of a flexible side frame supported conveyor was heavily loaded.

To overcome the excessive deepening of the trough of the conveying reach, rigid spreader members were made a part of the troughing idler roller assemblies that spanned the distance between the generally parallel flexible side frames of the conveyor system. The idler rollers were still formed with flexible shafts, but the distance between the flexible side frame members was rigidly fixed at the idler roller assembly by the spreader members. While the spreader members prevented excessive deepening of the trough of the conveyor conveying reach, they changed some of the advantageous characteristics of flexible side frame conveyors.

One of the advantageous characteristics of flexible side frame conveyors which was changed by the spreader member was the inherent ability of the flexible side frames to maintain the flexible shafted idler roller assembly in contact with the belt conveying reach under all conditions of belt loading. For example, when a flexible shafted idler roller without a rigid spreader member was utilized in a flexible side frame conveyor and when the conveying reach of the belt was lightly loaded, the flexible side frames exerted tension on the flexible shafted idler roller assembly so that the trough of the idler roller assembly became more shallow and the idler roller was maintained in contact with the under side of the belt throughout the entire width of the belt. When the load on the conveying reach was increased, the trough of the flexible shafted idler roller assembly deepened by drawing the flexible side frame members more closely toward each other.

When the spreader member was added to the flexible side frame supported conveyor system, the distance between the flexible side frame members was fixed at the roller assembly. Accordingly, when the conveying reach of the belt was relatively lightly loaded, the conveyor belt conveying reach tended to flatten so that it rode up out of the trough of the idler roller assembly. In such a situation, only the edges of the belt conveying reach contacted the idler rollers so that there was excessive conveyor belt wear along the edges of the belt. When the spreader members fixed the distance between the flexible side frames, the ability of the flexible side frame conveyor to maintain the flexible shafted idler roller in contact with the belt conveying reach throughout the width of the belt conveying reach no longer existed.

Another advantage of flexible shafted idler rollers is the fact that they may easily be shipped and stored with little danger of shaft deformation and shaft breakage. Further, the flexible shafted idler rollers can often be disassembled into relatively short lengths so that they may more easily be shipped and stored.

When it became necessary to utilize spreader members with the flexible side frame conveyors, this ease of handling characteristic of the idler roller assemblies was often lost. The spreader members were rigid structural elements which were long enough to span the distance between the flexible side frames of the conveyor system. It became the practice to assemble the idler rollers and the spreader members as a unit and not to disassemble them. Accordingly, a spreader member and an idler roller, when assembled as a unit, made a bulky, difficult to handle conveyor system element.

The present invention contemplates several forms of idler roller assemblies that provide the aforementioned advantages of flexible shafted idler roller assemblies when utilized without spreader members in the flexible side frame supported belt conveyor systems but which eliminate the excessive troughing of the belt conveyor reach that originally initiated the use of rigid spreader members.

To accomplish these desirable results, the present invention provides idler roller assemblies which are completely flexible within the normal range of belt conveying reach loading conditions, but which inhibit the excessive troughing of the belt conveying reach when additional loads are placed upon the conveying reach.

In operation, the idler roller assemblies of the present invention permit deepening of the belt conveyor belt conveying reach trough by permitting the flexible side frame members of the conveyor system to be drawn toward each other as the belt conveying reach load increases. After the flexible side frames move together to within a minimum distance of each other, their further movement toward each other is inhibited by the idler roller construction of the present invention.

With the foregoing considerations in mind, it is a primary object of the present invention to provide an improved idler roller assembly.

Another object of this invention is to provide an improved troughing idler roller assembly for a flexible side frame supported belt conveyor.

Another object of the present invention is to provide an idler roller assembly for a flexible side frame supported belt conveyor which produces the advantages of a flexible shafted idler assembly, but which eliminates excessive troughing of the belt conveying reach.

Another object of the invention is to provide an idler roller assembly which eliminates the requirement for separate, rigid spreader members when utilized with flexible side frame supported belt conveyors.

Another object of the present invention is to provide idler roller assemblies which may be compactly and safely packed for shipping and storage.

These and other objects of this invention will become apparent as this description proceeds in conjunction with the accompanying drawings.

In the drawings:

FIGURE 1 is an elevational view of one embodiment of the present invention.

FIGURE 2 is a fragmentary perspective view on an enlarged scale of the shaft hinge of the embodiment of FIGURE 1.

FIGURE 3 is a partial elevation on an enlarged scale showing the relative positions of two of the cylindrical rollers of the embodiment of FIGURE 1.

FIGURE 4 is an elevational view, partially in section, showing a second embodiment of the present invention.

FIGURE 5 is a sectional view on an enlarged scale showing certain details of construction of the individual cylindrical roller members of the embodiment of FIGURE 4.

FIGURE 6 is a sectional elevation of a third embodiment of the present invention.

FIGURE 7 is a sectional view on an enlarged scale showing certain details of construction of the individual cylindrical roller members of the embodiment of FIGURE 6.

FIGURE 8 is an enlarged sectional view taken along line 8—8 of FIGURE 7.

Referring now to FIGURES 1–3 there is shown an idler roller assembly, generally designated 10. The idler roller assembly 10 extends transversely between two longitudinally extending flexible side frame members 12 and 14. The flexible side frame members 12 and 14 are constructed of wire rope or the like and are trained along a conveying course.

The troughed conveying reach 16 of an endless belt conveyor is positioned in generally parallel relation to the side frame members 12 and 14 and is supported by idler roller assemblies 10.

The shaft member of the idler roller assembly 10 is divided into shaft member end sections 18 and 20, and a shaft member center section 22. The end sections 18 and 20 and the center section 22 of the shaft member are joined by hinges indicated generally at 24. The division of the shaft member into three sections is by way of example only, and it will be appreciated that the shaft member could be divided into a greater number of sections or a lesser number as the individual requirements of the particular conveyor system dictate.

Each of the hinges 24 are formed with a pair of angled hinge arms 26 secured to the shaft member end sections 18 or 20. The angled arms 26 are best seen in FIGURE 2 and may be either formed integrally with the shaft member end sections 18 or 20 or may be affixed thereto as by welding. The shaft member center section 22 has a hinge arm 28 secured to each of its ends. The hinge arm 28 may be secured to the shaft member center section as by welding or it may be formed integrally therewith.

Each of the hinge arms 26 and 28 has an enlarged portion 30 formed at its end. The enlarged portions 30 are bored to receive a hinge pin 32 that is disposed transversely of the shaft member.

A pad 34 preferably formed of a deformable resilient substance such as rubber, may be secured to the ends of the end sections 18 and 20 and the center section 22 to provide a resilient cushion when the ends of the respective shaft member sections contact each other. The pad 34 is not a critical portion of the present invention and may be omitted if desired. Its function will become apparent as this description proceeds.

A rigid cylindrical roller member 38 is rotatably mounted on each of the shaft member sections 18, 20, and 22, and supported thereby. The rigid cylindrical roller members support the troughed conveying reach of the endless belt conveyor.

With the foregoing arrangement of the components of the idler roller assembly in mind, the operation of the idler roller assembly of FIGURES 1–3 in a flexible side frame supported conveyor may be considered. The individual sections 18, 20 and 22 of the shaft member of the idler roller assembly are connected by hinge pins 32. As clearly shown in FIGURE 1, the hinge pins 32, about which the sections pivot relative to each other, are offset from and disposed below the longitudinal axes of the individual shaft sections 18, 20 and 22. The shaft member end sections 18 and 20 have clamps 36 secured to their outer end portions to clamp the idler roller assemby 10 between the flexible side frame members 12 and 14.

With such a construction, the individual shaft sections may move relative to each other to vary the depth of the trough of the belt conveying reach 16. However, the depth of the belt conveying reach trough may not exceed a predetermined maximum. The maximum depth of the belt conveying reach trough is determined by the angles at which the hinge arms 26 and 28 are set relative to the end sections 18 and 20 and the center section 22 respectively.

FIGURES 1 and 3 illustrate the relative positions of the shaft sections and cylindrical rollers 38 under two belt loading conditions. In FIGURE 1, the belt conveying reach is relatively lightly loaded. The tension in the flexible side frame members 12 and 14 is sufficient to exert tension on the idler roller assembly 10. This tension maintains the idler roller assembly 10 in suspension between the flexible side frame members 12 and 14. The trough of the belt conveying reach 16 is relatively shallow, and the pads 34 on the ends of the shaft end sections 18 and 20 and the shaft center section 22 are are maintained out of contact with each other by the tension exerted on the idler roller assembly 10.

In FIGURE 3 the solid lines of the shaft sections 20 and 22 and the cylindrical roller members 38 represent the relative positions of these components when the conveyor belt conveying reach is relatively lightly loaded as shown in FIGURE 1. The phantom line positions of shaft 20 and cylindrical member 38, represented by the reference numerals 20' and 38' respectively, show the position of the shaft section 20' and roller member 38' when the belt conveying reach is heavily loaded. When the belt conveying reach is heavily loaded, a downward force is exerted on the idler roller assembly 10. This downward force tends to pull the flexible side frame members 12 and 14 toward each other. As the flexible side frame members 12 and 14 are drawn toward each other, the trough of the conveying reach 16 begins to deepen.

As the trough of the conveying reach 16 deepens, the shaft member sections 18, 20, and 22 move about the hinge pins 32 and begin to close. The resilient pads 34 come into contact with each other. When the resilient pads 34 contact each other, the inward movement of flexible side frame members 12 and 14 is inhibited because the shaft member now resists further closing of hinges 24.

The phantom line positions of the shaft end sections 20' and the cylindrical roller member 38' of FIGURE 3 represents the relative positions of the shaft sections and cylindrical rollers when the belt conveying reach trough is at a maximum depth. It will be appreciated that the embodiment of FIGURES 1–3 provides an idler roller assembly which has the advantages of a flexible shafted idler roller and which, at the same time, prevents the excessive troughing of the belt conveying reach that is a major drawback of flexible shafted conveyor assemblies when utilized with flexible side frame supported belt conveyor systems.

When the conveyor belt is loaded under normal conditions, the flexible side frame members 12 and 14 are maintained apart and the depth of the trough of the conveying reach 16 may vary according to the load on the conveying reach. If the conveying reach is lightly loaded, the hinge pins 32 allow hinges 24 to open to permit movement of the shaft member sections 18, 20 and 22 to relative to each other. The cylindrical roller members 38 may then follow the belt conveying reach as it tends to flatten. Thus, the cylindrical roller members 38 remain in contact with the lightly loaded belt conveying reach throughout its width. When the conveying reach of the belt becomes excessively loaded, the flexible side frame members 12 and 14 move toward each other until they are at a minimum distance apart. At that time the resilient pads 34 on the ends of the individual shaft member sections contact each other and inhibit further movement of the flexible side frame members 12 and 14 toward each other.

As previously stated, the resilient pads 34 are not essential features of the present invention. They may be dispensed with and the metal shaft member sections may directly abut each other. The shaft member sections will provide a rigid member between the side frame members 12 and 14 and limit movement of the side frame members toward each other when the conveying reach trough is extended to its maximum depth.

FIGURES 4 and 5 show a second embodiment of the present invention. Referring to FIGURES 4 and 5, the idler roller assembly 50 extends between flexible side frame members 52 and 54. The troughed conveying reach 56 of an endless belt conveyor is disposed between the flexible side frame members 52 and 54. A shaft member 58 is clamped to the flexible side frame members 52 and 54 at each of its ends by clamps 60.

In this embodiment the shaft member 58 may be formed of a flexible material such as a length of wire rope or a flexible metal ribbon or the like. The shaft member 58 supports a plurality of individual cylindrical rollers 62 as will be described. In the present instance, three roller members 62 are shown, however, it will be understood that a greater or fewer number of rollers may be utilized on the shaft member 58 as the requirements of the conveyor system dictate.

FIGURE 5 shows the constructional details of the individual roller members 62. The roller members 62 each consist of a tubular roll 64 rotatably supported on shaft member 58. Each roll 64 is supported by two resilient annular bearing carriers 66.

In their relaxed or undistorted condition as shown at the left side of FIGURE 5, the resilient bearing carriers 66 have a frusto conical concave end wall 68, a cylindrical external surface 70, a cylindrical internal surface 72, and a frusto conical convex end wall 74. An annular shoulder 76 is formed adjacent the cylindrical external surface 70 of the bearing carrier.

Each of the resilient annular bearing carriers 66 surrounds a bearing assembly 78 which is formed with a generally cylindrical outer bearing race 80, a generally cylindrical bearing inner race 84, and antifriction bearing means 86 disposed therebetween. Bearing outer race 80 has an annular shoulder 82 formed thereon for a purpose to be described.

In assembling the idler roller assembly 50, the individual roller members 62 are strung on the shaft member 58. A plurality of sleeves 88 are used as spacer-stop members to properly position the roller members 62. A function of these sleeves 88 will be clarified as this description proceeds.

In assembling the idler roller assembly 50, a spacer sleeve 88 is first placed upon the flexible shaft member 58 adjacent one end of the shaft member 58. The sleeve 88 is secured to the shaft member 58 as by peening or the like so that it may not be moved relative to the shaft member 58 by force within the tensile strength of the shaft member 58. A roller assembly 62 including the two annular bearing carriers 66 and the bearing assemblies 78 is then placed on the shaft member 58. When the roller member 62 is initially placed on the shaft member 58, the bearing carriers 66 are in their relaxed condition as shown at the left of FIGURE 5. The roller member 62 is moved along the shaft member 58 until one of the bearing assembly inner races 84 contacts the sleeve member 88 already secured to the shaft member 58. An axial force is then exerted upon the inner race 84 of the other bearing assembly to deform the resilient bearing carriers 66.

An axial force of such magnitude is exerted upon the bearing that the annual bearing carrier 66 assumes the deformed shape shown at the right of FIGURE 5. This deformed shape causes the annular bearing carrier to tightly engage both the internal surface of the tubular member 64 and the external surface of the cylindrical outer race 80 of the bearing assemblies. When both resilient bearing carriers 66 of the roller assembly 62 have been deformed, a second sleeve member 88 is secured to shaft member 58 to maintain the roller assembly 62 in place.

When roller assembly 62 is thereby mounted upon the shaft member 58 for rotation relative to shaft member 58, a third sleeve member 88 is then secured to the shaft member 58 at a predetermined distance from the second sleeve member 88. A second roller assembly is then positioned on the shaft member 58 in abutting relation with the third sleeve member 88. A compressive force is then exerted on the second roller assembly 62 to deform its resilient bearing carriers 66. A fourth sleeve member 88 is then secured to the shaft member 58 to retain the second roller member 62 in position. In a like manner, the remaining roller members 62 are placed upon the shaft member 58 until the proper number of roller members have been secured to shaft member 58.

When the roller members 62 are mounted in place on the shaft member 58, the resilient bearing carriers deform and the frusto-conical convex surface 74 of each bearing carrier protrudes to assume the shape approximating 74' at the right of FIGURE 5. This protrusion 74' serves to inhibit the troughing of the idler roller assembly 50 as will be described.

When the idler roller assembly 50 is secured to the flexible side frame members 52 and 54, it functions as a flexible shafted idler roller assembly. So long as the load on the belt conveying reach 56 remains within normal limits, the tension in flexible side frame members 52 and 54 maintains them spaced from each other. The troughing of belt conveying reach 56 then varies with the load, and the roller members 62 of idler roller assembly 50 remain in contact with the underside of the conveying reach 56 throughout the width of the conveying reach 56.

When an excessive load is placed upon the conveying reach 56, the downward force exerted by the conveying reach 56 draws the flexible side frame members 52 and 54 toward each other to deepen the troughing of the conveying reach 56. As the trough of conveying reach 56 deepens, the bulging protrusions 74' of the adjacent bearing carriers 66 come into contact with each other at A as shown in FIGURE 4. This contact of the adjacent bearing carriers 66 inhibits further movement of the flexible side frame members 52 and 54 toward each other so that further deepening of the trough of conveying reach 56 is inhibited.

The initial distance between adjacent sleeve members 88 on the shaft member 58 determines the maximum trough depth permitted by the idler roller assembly 50. If the adjacent sleeves 88 are relatively far apart, a relatively deep trough may be formed before the bearing carriers of adjacent roller assemblies 62 contact each other. On the other hand, if the sleeve members 88 are initially placed relatively close to each other, they will permit only a relatively shallow trough before the resilient bearing carriers contact each other and inhibit further movement of the flexible side frame members toward each other.

FIGURES 6–8 show a third embodiment of the present invention. The idler roller assembly 100 extends between flexible side frame members 102 and 104. The troughed conveying reach 106 of the endless belt conveyor extends longitudinally between the spaced flexible side frame members.

The idler roller assembly 100 has a shaft member 108 which is formed of preformed spring steel. As shown in FIGURES 6–8, the shaft member 108 is spring steel of rectangular cross section and is formed by bending it, as at 108a, to provide the initial troughing effect. The use of spring steel of rectangular cross section for the shaft member 108 is by way of example only, the cross sectional shape of the shaft member 108 not being a critical part of the present invention. Any cross sectional shape of the shaft member 108 is permissible so long as the shaft member 108 has the requisite strength and flexing qualities.

The shaft member 108 is secured to the flexible side frame members 102 and 104 by clamps 110. A plurality of roller memers 112 are supported by the shaft member 108 for rotation relative to shaft member 108. In FIGURE 6 three roller members 112 are shown on shaft member 108. It will be appreciated that a greater or fewer number of roller members 112 may be utilized as the particular conveyor usage dictates.

Constructional details of the roller members 112 may be seen in FIGURE 7 which is drawn on an enlarged scale. Each roller member 112 has a hollow tubular roll 114. The internal cylindrical surface of the tubular rolls 114 is machined adjacent the end portions of the rolls to create machined internal end surfaces 116. The juncture of machined end surfaces 116 and the natural internal cylindrical surface of tubular roll 114 creates inwardly extending annular shoulders 118 at each end of tubular roll 114.

Each roller member 112 is provided with a pair of resilient bearing carriers 120. Resilient annular bearing carriers 120 each have a frusto conical convex end wall 122, a frusto conical concave end wall 124, a cylindrical external surface 126, and a cylindrical internal surface 128. The cylindrical internal surface 128 of each resilient annular bearing carrier 120 has a portion of reduced diameter adjacent the frusto conical concave end wall 124 which forms an inwardly extending annular shoulder 130 adjacent internal surface 128.

Bearing assemblies 132 are received by each of the resilient annular bearing carriers 120. The bearing assemblies 132 each have a generally cylindrical outer race 134, a generally cylindrical inner race 136, and antifriction means 138 therebetween. The outer race 134 of each bearing assembly is contiguous to the cylindrical internal surface 128 of the resilient bearing carrier and abuts the annular shoulder 130 on surface 128. The inside diameter of each bearing inner race 136 is of such size that it passes freely over shaft member 108.

Internal bearing washers 140 or external bearing washers 142 are utilized to secure the bearing inner race to shaft member 108 depending upon the location of the particular bearing to be secured. Internal bearing washers 140 are, in effect, double external washers 142. When two bearing assemblies are in close spaced relation to each other, as when they are at the ends of adjacent roller members 112, a single internal bearing washer 140 is utilized to secure both inner races 136 to the shaft member 108. When the particular bearing assembly stands alone, as when it is on the end of a roller member 112 adjacent the flexible side frame member 102 or 104, an external bearing washer 142 is utilized to secure the inner race 136 to the shaft member 108.

Each internal bearing washer 140 is formed with a spherical central section 144 having protruding cylindrical extensions 146. An aperture 148 is formed through the cylindrical extensions and the spherical center section. The aperture 148 is of a cross section which conforms in shape to the cross section of shaft member 108 as is best seen in FIGURE 8. The internal bearing washer 140 is formed of a resilient, deformable, incompressible substance such as rubber or the like.

The external resilient bearing washer 142 consists of an enlarged head portion 150 having a cylindrical extension 152 extending therefrom. An aperture 154, of a cross section which conforms to the cross section of shaft 108, is formed longitudinally through the cylindrical extension 152 and the enlarged head portion 150.

The assembly of the idler roller of FIGURES 6–8 is similar to that previously described in connection with FIGURES 4 and 5. A roller member 112 is placed about the shaft member 108. An internal bearing washer 140 is then placed upon shaft 108 so that its cylindrical extension extends into the cylindrical inner race 136 of the bearing assembly. The next adjacent idler roller 112 is then placed upon shaft member 108 and positioned so that its bearing assembly inner race is forced over the cylindrical extension on internal bearing washer 140. Once all the idler roller assemblies have been positioned on shaft members 108 and all of the internal bearing washers 140 are in place, an axial compressive force is exerted upon the two external bearing assemblies 132 to deform the annular bearing carriers 120 to the shapes shown in FIGURES 6 and 7. This deformation of bearing carriers 120 causes their cylindrical external surfaces 126 to forcefully engage the machined internal end surfaces 116 of the rolls 114. The deforming force also causes the bearing carrier cylindrical internal surfaces 128 to forcefully engage the outer race of bearing assemblies 132. With the resilient bearing carriers 120 properly deformed, the external bearing washers 142 are inserted and clamped in place by securing members 156.

The components of the roller assembly 100 are so proportioned that when the bearing carriers 120 are properly deformed the internal bearing washers 140 are located over the bent portion 108a of the shaft member 108.

The idler roller assembly 100, when utilized with a flexible side frame supported belt conveyor, provides a roller assembly which is less flexible than those previously described in connection with FIGURES 1–5. However, the inherent resiliency of the spring steel shaft member 108 permits increased troughing of the belt conveying reach 106 when the load upon the belt is increased. The internal angle at the bent portion 108a of the shaft member 108 decreases to permit the flexible side frame members 102 and 104 to move toward each other and thereby deepen the trough. The size and material of shaft member 108 are so selected that the greatest load which will be placed upon the belt conveying reach 106 will not excessively trough the idler roller assembly and the movement of flexible side frame members 102 and 104 will thereby be inhibited. In addition to the strength of shaft member 108, the internal bearing washers 140 serve to inhibit the movement of flexible side frame members 102 and 104 toward each other once a maximum trough depth has been reached. As may be seen in FIGURES 6 and 7, as the depth of the trough increases and the angle of bend at 108a decreases, the spherical center section 144 of internal bearing washer 140 becomes deformed between the adjacent bearing assemblies 132 and inhibits further bending of the shaft member 108.

From the foregoing description of the embodiments of this invention, it may be seen that idler roller assemblies are provided which may be efficiently utilized with flexible side frame supported belt conveyors. These embodiments each provide the advantages of a flexible shafted idler roller assembly but yet, at the same time, do not permit excessive troughing of the belt conveying reach.

According to the provisions of the patent statutes, I have explained the principle, preferred construction and mode of operation of my invention and have described what I now consider to represent its best embodiments. However, I desire to have it understood that, within the scope of the appended claims, the invention may be practiced otherwise than as specifically illustrated and described.

I claim:

1. A troughing idler roller assembly comprising a shaft member transversely spanning a pair of longitudinally extending, spaced flexible side frame members, said shaft member having end portions secured to each of said side frame members, said shaft member being formed of flexible material for deepening of said idler roller trough by movement of said side frame members toward each other, a plurality of roller members rotatably supported in end to end relation by said shaft member and axially fixed relative to said shaft member, said roller members including rigid cylindrical tubes supported for rotation relative to said shaft member by resilient, deformable bearing carriers, said bearing carriers forming end walls for said roller members, said bearing carriers of adjacent roller members arranged to abut each other upon movement of said side frame members toward each other to thereby limit the depth of said idler roller trough by inhibiting the movement of said side frame members toward each other at a minimum distance from each other.

2. A troughing idler roller assembly comprising a shaft member transversely spanning a pair of longitudinally extending, spaced flexible side frame members, said shaft member having end portions secured to each of said side frame members, said shaft member being constructed of spring steel preformed to have a plurality of straight portions connected by bent portions, said spring steel shaft member arranged for deepening of said idler roller trough by flexing movement of said side frame members toward each other, a plurality of roller members rotatably supported by said shaft member, said roller members including rigid cylindrical tubes supported for rotation relative to said shaft by resilient, deformable bearing carriers, bearing assemblies, and resilient, deformable internal and external bearing washers, said internal bearing washers having enlarged center portions disposed between the bearing carriers of adjacent roller members, said internal bearing washers surrounding said shaft member bent portions, said bearing assemblies of adjacent roller members arranged to abut said internal bearing washer center portions upon movement of said side frame members toward each other, the inherent strength and rigidity of said spring steel shaft member and the abutting of said bearing washer center portions by said bearing assemblies of adjacent roller members limiting the depth of said idler roller trough by inhibiting the movement of said side frame members toward each other at a minimum distance from each other.

References Cited by the Examiner
UNITED STATES PATENTS

| | | |
|---|---|---|
| 2,820,541 | 1/58 | Barnish et al. |
| 2,942,721 | 6/60 | Kidd et al. |
| 2,966,255 | 12/60 | Gleeson. |

SAMUEL F. COLEMAN, *Primary Examiner.*

JULIUS E. WEST, ERNEST A. FALLER, Jr.,
*Examiners.*